United States Patent
Tomala et al.

(10) Patent No.: US 10,581,495 B2
(45) Date of Patent: Mar. 3, 2020

(54) PHYSICAL LAYER CONFIGURATION CONTINUITY DURING RADIO RESOURCE CONTROL RESTORATION

(71) Applicant: NOKIA TECHNOLOGIES OY, Espoo (FI)

(72) Inventors: Malgorzata Tomala, Wroclaw (PL); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/023,924

(22) Filed: Jun. 29, 2018

(65) Prior Publication Data

US 2019/0058509 A1 Feb. 21, 2019

Related U.S. Application Data

(60) Provisional application No. 62/547,353, filed on Aug. 18, 2017.

(51) Int. Cl.
*H04W 76/19* (2018.01)
*H04B 7/0413* (2017.01)
*H04L 29/08* (2006.01)
*H04W 76/27* (2018.01)

(52) U.S. Cl.
CPC ......... *H04B 7/0413* (2013.01); *H04L 69/323* (2013.01); *H04W 76/19* (2018.02); *H04W 76/27* (2018.02)

(58) Field of Classification Search
CPC .............. H04B 7/0413; H04L 69/323; H04W 76/10–27

USPC .................................................. 375/259–352
See application file for complete search history.

(56) References Cited

U.S. PATENT DOCUMENTS

| | | | | |
|---|---|---|---|---|
| 9,439,103 B2* | 9/2016 | Pesola | ................. | H04W 52/365 |
| 9,445,450 B2* | 9/2016 | Dalsgaard | ........... | H04W 74/006 |
| 9,455,843 B2* | 9/2016 | Yli-Tuomi | .......... | H04L 12/6418 |
| 9,510,387 B2* | 11/2016 | Vesterinen | .............. | H04W 8/02 |
| 9,560,690 B2* | 1/2017 | Jha | .................... | H04W 36/0055 |
| 9,578,634 B2* | 2/2017 | Navratil | ............. | H04W 72/042 |
| 9,781,764 B2* | 10/2017 | Lunden | ................. | H04W 76/19 |
| 9,838,921 B2* | 12/2017 | Dalsgaard | ......... | H04W 36/0055 |
| 9,872,247 B2* | 1/2018 | Keskitalo | .......... | H04W 52/0212 |
| 9,930,589 B2* | 3/2018 | Virtej | .................... | H04W 76/15 |
| 10,070,430 B2* | 9/2018 | Xu | .................... | H04W 72/0426 |
| 10,356,677 B2* | 7/2019 | Michaelsen | ............. | H04L 5/001 |
| 10,440,614 B2* | 10/2019 | Koskinen | ............. | H04L 1/1838 |

(Continued)

*Primary Examiner* — James M Perez
(74) *Attorney, Agent, or Firm* — Squire Patton Boggs (US) LLP

(57) ABSTRACT

Systems, methods, apparatuses, and computer program products for physical layer configuration continuity during radio resource control (RRC) restoration. One method includes receiving, by a network node, a request for radio resource control (RRC) re-establishment or resume from a user equipment. The request comprises an indication of parameter continuity that was a part of the user equipment's configuration. The method may further include, when it is determined to accept the request for radio resource control (RRC) re-establishment or resume, generating a radio resource control (RRC) message for facilitating continued configuration of lower layer parameters for the user equipment.

21 Claims, 4 Drawing Sheets

(56) References Cited

U.S. PATENT DOCUMENTS

| | | | |
|---|---|---|---|
| 2002/0110106 A1* | 8/2002 | Koo | H04B 7/2628 370/341 |
| 2002/0115443 A1* | 8/2002 | Freiberg | H04L 1/0002 455/450 |
| 2009/0239563 A1* | 9/2009 | Ou | H04W 76/19 455/509 |
| 2010/0304748 A1* | 12/2010 | Henttonen | H04W 36/0077 455/436 |
| 2011/0035639 A1* | 2/2011 | Earnshaw | H04L 1/1812 714/748 |
| 2012/0129499 A1* | 5/2012 | Li | H04L 63/068 455/411 |
| 2013/0144551 A1* | 6/2013 | Zhou | G06F 17/00 702/122 |
| 2013/0210422 A1* | 8/2013 | Pani | H04W 48/16 455/423 |
| 2014/0038579 A1* | 2/2014 | Henttonen | H04W 8/22 455/418 |
| 2014/0080468 A1* | 3/2014 | Zhang | H04W 24/02 455/418 |
| 2015/0351148 A1* | 12/2015 | Jha | H04W 36/0055 455/436 |
| 2016/0119828 A1* | 4/2016 | Dalsgaard | H04W 36/0055 455/444 |
| 2016/0174283 A1* | 6/2016 | Dalsgaard | H04W 76/19 455/435.2 |
| 2016/0255552 A1* | 9/2016 | Uchino | H04B 7/024 370/329 |
| 2017/0099621 A1* | 4/2017 | Michaelsen | H04W 36/0033 |
| 2017/0251512 A1* | 8/2017 | Koskinen | H04B 17/318 |
| 2018/0160467 A1* | 6/2018 | Quan | H04W 76/10 |
| 2018/0206080 A1* | 7/2018 | Chen | H04W 76/27 |
| 2018/0234877 A1* | 8/2018 | Liu | H04L 29/06 |
| 2018/0262935 A1* | 9/2018 | Wegmann | H04W 24/00 |
| 2018/0279275 A1* | 9/2018 | Chen | H04W 72/0406 |
| 2018/0302944 A1* | 10/2018 | Chang | H04W 76/20 |
| 2018/0310359 A1* | 10/2018 | Takahashi | H04W 76/27 |
| 2018/0352590 A1* | 12/2018 | Sha | H04W 76/10 |
| 2018/0359064 A1* | 12/2018 | Kim | H04L 5/001 |
| 2018/0368018 A1* | 12/2018 | Kim | H04W 24/10 |
| 2018/0368205 A1* | 12/2018 | Park | H04L 5/0048 |
| 2019/0021134 A1* | 1/2019 | Zhang | H04W 76/27 |
| 2019/0028860 A1* | 1/2019 | Futaki | H04W 76/20 |
| 2019/0045482 A1* | 2/2019 | Lee | H04W 76/28 |
| 2019/0045573 A1* | 2/2019 | Schliwa-Bertling | H04W 76/11 |
| 2019/0058509 A1* | 2/2019 | Tomala | H04W 76/27 |
| 2019/0059119 A1* | 2/2019 | Hapsari | H04W 76/10 |
| 2019/0082366 A1* | 3/2019 | Miao | H04W 76/10 |
| 2019/0116541 A1* | 4/2019 | Hong | H04W 36/36 |
| 2019/0124711 A1* | 4/2019 | Dai | H04W 76/18 |
| 2019/0124713 A1* | 4/2019 | Stattin | H04W 76/25 |
| 2019/0124714 A1* | 4/2019 | Wang | H04W 76/27 |
| 2019/0150218 A1* | 5/2019 | Futaki | H04W 4/80 370/329 |
| 2019/0174571 A1* | 6/2019 | Deenoo | H04W 76/28 |
| 2019/0223249 A1* | 7/2019 | Koskinen | H04W 76/27 |
| 2019/0239273 A1* | 8/2019 | Berggren | H04W 76/11 |
| 2019/0246318 A1* | 8/2019 | Kim | H04W 8/08 |
| 2019/0296805 A1* | 9/2019 | Son | H04L 5/0048 |
| 2019/0327784 A1* | 10/2019 | Tarimala | H04W 72/0413 |
| 2019/0342804 A1* | 11/2019 | Futaki | H04W 36/0069 |
| 2019/0350032 A1* | 11/2019 | Chen | H04W 76/11 |
| 2019/0356460 A1* | 11/2019 | Tsuboi | H04W 80/02 |
| 2019/0357109 A1* | 11/2019 | Hong | H04W 8/26 |

\* cited by examiner

```
-- ASN1START

RRCConnectionReestablishment ::=    SEQUENCE {
    rrc-TransactionIdentifier          RRC-TransactionIdentifier,
    criticalExtensions                 CHOICE {
        c1                                 CHOICE{
            rrcConnectionReestablishment-r8    RRCConnectionReestablishment-r8-IEs,
            spare7 NULL,
            spare6 NULL, spare5 NULL, spare4   NULL,
            spare3 NULL, spare2 NULL, spare1   NULL
        },
        criticalExtensionsFuture           SEQUENCE {}
    }
}

RRCConnectionReestablishment-r8-IEs ::= SEQUENCE {
    radioResourceConfigDedicated       RadioResourceConfigDedicated,
    nextHopChainingCount               NextHopChainingCount,
    nonCriticalExtension               RRCConnectionReestablishment-v8a0-IEs    OPTIONAL
}

RRCConnectionReestablishment-v8a0-IEs ::= SEQUENCE {
    lateNonCriticalExtension           OCTET STRING                             OPTIONAL,
    nonCriticalExtension               SEQUENCE {}                              OPTIONAL
}

RRCConnectionReestablishment-v8a0-IEs ::= SEQUENCE {
    lateNonCriticalExtension           OCTET STRING (CONTAINING RRCConnectionReestablishment-v1010-IEs)
                                                                                OPTIONAL,
    nonCriticalExtension               SEQUENCE {}                              OPTIONAL
}

RRCConnectionReestablishment-v1010-IEs ::= SEQUENCE {
    antennaInfoDedicatedPCell-v1010    AntennaInfoDedicated-v1010               OPTIONAL,  -- Need ON
    -- Following field is only for late non-critical extensions from REL-10
    nonCriticalExtension               SEQUENCE {}                              OPTIONAL
}

AntennaInfoDedicated-v1010::=    SEQUENCE {
    maxLayersMIMO-r10                  ENUMERATED {twoLayers, fourLayers, eightLayers}    OPTIONAL    -- Need
ON
}

-- ASN1STOP
```

Fig. 2

PHYSICAL LAYER CONFIGURATION CONTINUITY DURING RADIO RESOURCE CONTROL RESTORATION

CROSS REFERENCE TO RELATED APPLICATIONS

This application claims priority from U.S. Provisional Application No. 62/547,353, filed on Aug. 18, 2017. The entire contents of this earlier filed application are hereby incorporated by reference in their entirety.

BACKGROUND

Field

Embodiments of the invention generally relate to wireless or cellular communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio (NR) access technology. Some embodiments may generally relate to physical layer configuration continuity during radio resource control (RRC) restoration, for example.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity (DC).

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the Node B or eNB may be referred to as a next generation or 5G Node B (gNB).

SUMMARY

One embodiment is directed to a method, which may include receiving, by a network node, a request for radio resource control (RRC) re-establishment or resume from a user equipment. The request comprises an indication of parameter continuity that was a part of the user equipment's configuration. When it is determined to accept the request for radio resource control (RRC) re-establishment or resume, the method may include generating a radio resource control (RRC) message for facilitating continued configuration of lower layers, e.g., physical layer parameters for the user equipment.

In certain embodiments, the indication of the parameter continuity includes an indication of maximum multiple-input multiple-output (MIMO) layers.

In some embodiments, the method may further include receiving an indication, from the user equipment, of an estimate of current channel quality to guide the network node in whether the user equipment's current configuration is still valid.

In certain embodiments, the method may further include receiving a predefined category of physical layer parameters that need to be maintained during radio resource control (RRC) re-establishment or resume.

In some embodiments, upon receiving radio resource control (RRC) connection re-establishment request from the user equipment, determining which order of multiple-input multiple-output (MIMO) layer was applicable.

In certain embodiments, the method may further include utilizing capabilities or context of the user equipment to maintain the maximum multiple-input multiple-output (MIMO) layer configuration continuity.

In some embodiments, the method may further include signaling the continued configuration to the user equipment, wherein the continued configuration comprises appropriate configuration for lower layers, including physical layer parameters according to capabilities or context of the user equipment.

Another embodiment is directed to an apparatus, which may include at least one processor and at least one memory comprising computer program code. The at least one memory and computer program code configured, with the at least one processor, to cause the apparatus at least to receive a request for radio resource control (RRC) re-establishment or resume from a user equipment. The request comprises an indication of parameter continuity that was a part of the user equipment's configuration. When it is determined to accept the request for radio resource control (RRC) re-establishment or resume, the at least one memory and computer program code configured, with the at least one processor, to cause the apparatus at least to generate a radio resource control (RRC) message for facilitating continued configuration of lower layers parameters for the user equipment.

In some embodiments, the indication of the parameter continuity may include an indication for facilitating continued configuration of lower layers physical layer parameters including maximum multiple-input multiple-output (MIMO) layers.

In certain embodiments, the at least one memory and computer program code are further configured, with the at least one processor, to cause the apparatus at least to receive an indication, from the user equipment, of an estimate of current channel quality to guide the apparatus in whether the user equipment's current configuration is still valid.

In some embodiments, the at least one memory and computer program code are further configured, with the at least one processor, to cause the apparatus at least to receive a predefined category of physical layer parameters that need to be maintained during radio resource control (RRC) re-establishment or resume.

In certain embodiments, upon receiving radio resource control (RRC) connection re-establishment request from the user equipment, the at least one memory and computer program code are further configured, with the at least one processor, to cause the apparatus at least to determine which order of multiple-input multiple-output (MIMO) layer was applicable.

In some embodiments, the at least one memory and computer program code are further configured, with the at least one processor, to cause the apparatus at least to utilize capabilities or context of the user equipment to maintain the maximum multiple-input multiple-output (MIMO) layer configuration continuity.

In certain embodiments, the at least one memory and computer program code are further configured, with the at least one processor, to cause the apparatus at least to signal the continued configuration to the user equipment, where the continued configuration comprises appropriate configuration for physical layer parameters according to capabilities or context of the user equipment.

Another embodiment is directed to an apparatus that may include receiving means for receiving a request for radio resource control (RRC) re-establishment or resume from a user equipment. The request includes an indication of parameter continuity that was a part of the user equipment's configuration. When it is determined to accept the request for radio resource control (RRC) re-establishment or resume, the apparatus may further include generating means for generating a radio resource control (RRC) message for facilitating continued configuration of physical layer parameters for the user equipment.

Another embodiment is directed to an apparatus that may include circuitry configured to receive a request for radio resource control (RRC) re-establishment or resume from a user equipment. The request includes an indication of parameter continuity that was a part of the user equipment's configuration. When it is determined to accept the request for radio resource control (RRC) re-establishment or resume, the apparatus may further include circuitry configured to generate a radio resource control (RRC) message for facilitating continued configuration of lower layers' parameters for the user equipment.

Another embodiment is directed to a non-transitory computer readable medium comprising program instructions stored thereon for performing at least the following: receiving a request for radio resource control (RRC) re-establishment or resume from a user equipment, where the request comprises an indication of parameter continuity that was a part of the user equipment's configuration; and, when it is determined to accept the request for radio resource control (RRC) re-establishment or resume, generating a radio resource control (RRC) message for facilitating continued configuration of physical layer parameters for the user equipment.

Another embodiment is directed to a method, which may include transmitting, by a user equipment, a request for radio resource control (RRC) re-establishment or resume to a network node. The request may include an indication of parameter continuity that was a part of the user equipment's configuration. The method may further include, when the network node accepts the request for radio resource control (RRC) re-establishment or resume, receiving a radio resource control (RRC) message that facilitates continued configuration of physical layer parameters for the user equipment.

Another embodiment is directed to an apparatus, which may include at least one processor and at least one memory comprising computer program code. The at least one memory and computer program code configured, with the at least one processor, to cause the apparatus at least to transmit a request for radio resource control (RRC) re-establishment or resume to a network node. The request comprises an indication of parameter continuity that was a part of the apparatus' configuration. When the network node accepts the request for radio resource control (RRC) re-establishment or resume, the at least one memory and computer program code configured, with the at least one processor, to cause the apparatus at least to receive a radio resource control (RRC) message that facilitates continued configuration of physical layer parameters for the apparatus.

Another embodiment is directed to an apparatus that may include transmitting means for transmitting a request for radio resource control (RRC) re-establishment or resume to a network node. The request may include an indication of parameter continuity that was a part of the apparatus' configuration. The apparatus may further include, when the network node accepts the request for radio resource control (RRC) re-establishment or resume, receiving means for receiving a radio resource control (RRC) message that facilitates continued configuration of physical layer parameters for the apparatus.

Another embodiment is directed to an apparatus that may include circuitry configured to transmit a request for radio resource control (RRC) re-establishment or resume to a network node. The request may include an indication of parameter continuity that was a part of the apparatus' configuration. The apparatus may further include, when the network node accepts the request for radio resource control (RRC) re-establishment or resume, circuitry configured to receive a radio resource control (RRC) message that facilitates continued configuration of physical layer parameters for the apparatus.

Another embodiment is directed to a non-transitory computer readable medium comprising program instructions for causing an apparatus to perform at least the following: transmitting a request for radio resource control (RRC) re-establishment or resume to a network node, where the request may include an indication of parameter continuity that was a part of the apparatus' configuration; and, when the network node accepts the request for radio resource control (RRC) re-establishment or resume, receiving a radio resource control (RRC) message that facilitates continued configuration of physical layer parameters for the apparatus.

BRIEF DESCRIPTION OF THE DRAWINGS

For proper understanding of the invention, reference should be made to the accompanying drawings, wherein:

FIG. 2 illustrates an example of the ASN.1 design for maximum MIMO layer indication configuration in RRC re-establishment procedure, according to certain embodiments;

DETAILED DESCRIPTION

Figure 1:
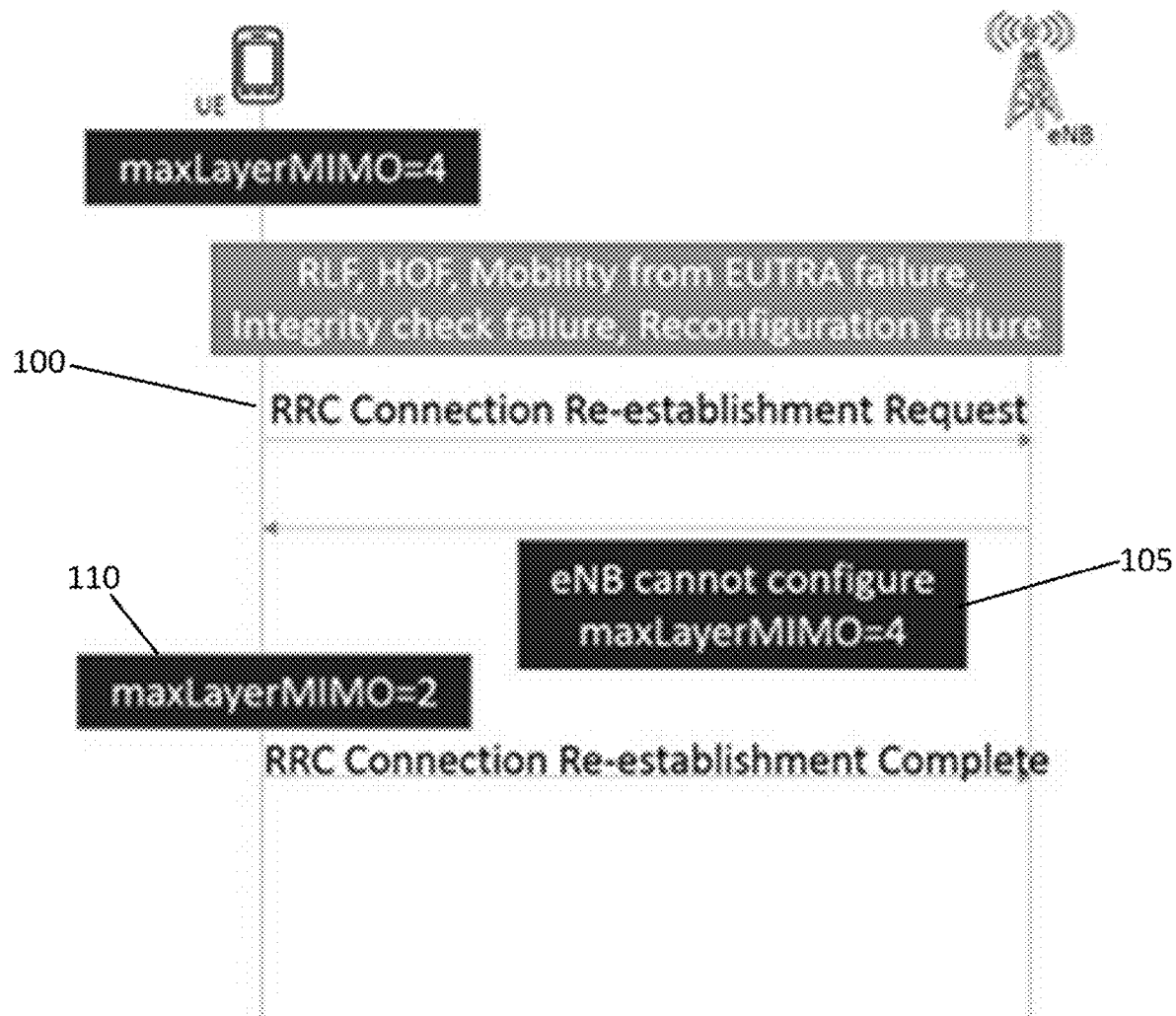
FIG. 1 illustrates an example of a signaling diagram.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to physical layer configuration continuity during radio resource control (RRC) restoration, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As will be discussed in detail in the following, certain embodiments provide a mechanism to re-establish or resume a connection with certain parameters (e.g., MIMO configuration of 4-layers and higher). By this, embodiments may ensure initial RRC layer awareness of key physical layer parameters settings in order to avoid device's performance downgrade at the re-establishment or resumption.

Multiple-input multiple-output (MIMO) techniques are key employments in next generation wireless communication systems. MIMO provides various benefits aimed at system performance improvement. Moreover, arranging network and device antennas in diversity configuration allows for various multiplexing, precoding and transmission methods supportive in achieving high data rates.

The baseline characteristics of each Transmission Mode (TM) and resulting transmission schemes are standardized in 3GPP technical specification (TS) 36.213. The UE in certain Transmission Mode(s) assume corresponding to the Transmission Mode modulation scheme and way of antenna port(s) use (i.e., transmission with a single-antenna port or diversity transmission schemes or spatial multiplexing using a transmission layer, transmission with open- or closed-loop).

4-layer spatial multiplexing is 3GPP Rel-8 functionality for Transmission Mode 3 and 4 (limited to only UE categories 5 and 8 due to lack of signaling). The indication of the used number of MIMO layers with Transmission Mode 3/4 has been further extended to wider set of UE categories (from 3GPP Rel-10 onwards for UE categories 6 and above by introducing assistance signalling in RRC Protocol).

It is noted that the Transmission Mode (TM) between the network (NW) and the UE should be consistently set. RRC protocol extensions introduced for 4-layer MIMO support for Transmission Mode 3 (TM3) and Transmission Mode 4 (TM4) allow dedicated UE configuration along RRC Connection Reconfiguration procedure. However, the 4-layer configuration cannot be configured nor continued in a re-establishment scenario. Even though the re-establishment procedure is used to re-establish RRC connection in a relatively smooth way, i.e., without UE transition to IDLE state, it does not provide a means to keep transmission mode configuration. This limitation comes from the RRC Connection Re-establishment message structure, which does not include an indication of 4-layer MIMO support. This prevents the network from signaling to the UE in the first step of the re-establishment procedure configuration that would allow 4-layer MIMO support continuity. In this case, the re-establishment is triggered regardless of UE and NW capabilities in place, and the UE being configured with higher layer MIMO order (>2) has to be downgraded in terms of transmission scheme. This problem arises for any higher order of MIMO layers.

FIG. 1 illustrates an example signaling diagram depicting the transmission mode downgrade forced by RRC re-establishment. As illustrated in FIG. 1, after receiving the RRC re-establishment request, at 100, the eNB cannot indicate support for 4-layer MIMO in the re-establishment response at 105. As a result, at 110, the UE must downgrade to 2-layer MIMO.

The problem will also arise in 5G deployments, for which RRC restoration is not yet defined. NR RRC connection reconstruction may be a common procedure for RRC re-establishment or RRC resume (which may be used in, e.g., transition from RRC_INACTIVE to RRC_CONNECTED). Thus, it will be desirable to ensure RRC layer awareness of key physical layer parameters settings in order to avoid performance downgrade of a device or UE. In general, the number of required MIMO layers could be the same or different between active/inactive states, and it would be desirable to be able change between those without additional configuration latency.

Therefore, certain embodiments introduce lower layer parameters continuity in case of RRC Connection Re-establishment or RRC Resume. In particular, an embodiment introduces physical layer parameters continuity in case of RRC Connection Re-establishment or RRC Resume. In particular, one embodiment provides that maximum layer MIMO configuration is a desired part of physical layer's capabilities to be continued through Control Plane re-establishment, and the UE can optionally indicate information to the NW that allows the NW to decide whether to continue to utilize the current physical layer (e.g., MIMO) configuration.

An embodiment includes direct NW node involvement in the maintenance of maximum MIMO layers configuration and signalling related information to the UE at a re-establishment phase. Some embodiments may rely on existing UE context in the network entity information and may seek to avoid transmission scheme downgrade.

In LTE deployments the maximum Layer MIMO configuration continuity may be facilitated when the RRC connection encounters a failure or a circumstance leading to RRC connection re-establishment. In NR deployments, UE capabilities or physical layer configuration parameters may be specifically categorized for the purposes of establishing a group of parameters that need to be continued in case of a connection break. Otherwise, performance level cannot be continued.

One embodiment may be applicable in a communications network including one or more UEs and one or more network nodes, such as an eNB or gNB. In an embodiment, a UE may indicate its request for RRC re-establishment/resume to the network. According to one embodiment, the UE request may indicate the parameter continuity, such as maximum MIMO layers, which was a part of its configuration. In certain embodiments, in a NR deployment, the UE may indicate its used physical layer parameters configuration from a group that determines its performance (according to predefined categorization). For example, the UE can indicate an estimate of current channel quality metric (obtained, e.g., via a UE measurement of the channel) to guide network in whether the current configuration is still valid.

In an embodiment, upon receiving a request for RRC re-establishment/resume for which UE context is found (e.g., from stored UE contexts or via context fetch), the NW node may determine whether to accept the request including the physical layer parameter continuation/reconfiguration (e.g., the UE indication of channel quality may prompt the NW node to change or retain the configuration). According to one embodiment, the NW node may be provided by the UE an indication that it was subject to lower layer configuration that is subject to continue. For example, the NW node may be provided by the UE an indication on maximum MIMO layer configuration (e.g., determined from maxLayersMIMO-r10 configuration parameter availability). In another example, in NR, the gNB may be provided with predefined characteristics of lower layers or category of physical layer parameters that need to be maintained during reestablishment or resumption. Alternatively, AMF may be provided with such UE's context and supports gNB to maintain device's configuration continuity.

According to some embodiments, upon receiving a RRC connection re-establishment request form the UE, the NW node may determine which order of MIMO layer was applicable. In an embodiment, the NW node may utilize UE capabilities or UE context to maintain the maximum MIMO layer configuration continuity and for that purpose apply extended version of RRC Connection Re-establishment message.

Therefore, in certain embodiments, the NW node may be configured to determine the expected transmission mode scheme continuity. In one embodiment, the NW node may determine the need for a maximum MIMO layer configuration for the UE. In another embodiment, the NW node may receive UE assistance information. For example, according to one embodiment, the assistance information may be indicated in RRC Connection Re-establishment request message.

In some embodiments, the NW node may utilize information on UE context or capabilities to generate configuration parameters on maximum MIMO layer configuration. According to one embodiment, the NW node may be provisioned by the core network (CN) about the transmission mode continuation need. In an embodiment, the NW node may use, during its RRC connection re-establishment the, determined configuration on maximum and best performance (max Layers MIMO). In another embodiment, the NW node may determine signalling for the best transmission mode configuration. In yet another embodiment, the NW node indication on the maximum layer MIMO configuration in a procedure used as a rescue from a failure or suspension state. According to certain embodiments, the rescue procedure may be realized by a resume message.

In one embodiment, upon deciding for re-establishment/resume, the NW node may generate a RRC message that facilitates continued configuration of physical layer parameters (e.g., maximum layer MIMO configuration). For example, according to an embodiment, the NW node may signal the consistent configuration to the UE, including appropriate configuration for physical layer parameters according to the UE context/capabilities (e.g., maximum MIMO layers used).

In certain embodiments, the UE may receive a RRC re-establishment/resume message from the NW. According to one embodiment, the UE may receive, within the RRC re-establishment message, information or an indication about the maximum layer MIMO configuration. In an embodiment, the indication may be received over dedicated signalling.

Thus, according to some embodiments, the UE may receive from the NW a configuration that applies continuity of the previously used parameters (e.g., transmission mode and maximum MIMO layer configuration). If the NW indicates the same configuration as before, the UE may maintain the currently used configuration and continue to use it (e.g., the UE maintains the maximum MIMO layer configuration as it had before re-establishment).

According to some embodiments, the maximum MIMO layer indication may originate from a NW node algorithm used to determine UE capabilities or context. In an embodiment, the maximum MIMO layer indication may be a reply to the UE originated request. In a related embodiment, the UE generated the indication on used maximum MIMO layer configuration, such as a flag indicating that transmission mode was in a higher rank. In some embodiments, the UE may consider itself to be allowed to deny maximum layer MIMO configuration.

In another embodiment, the UE information or indication about the maximum layer MIMO configuration in a procedure used as a rescue from a failure or suspension state. In a related embodiment, the rescue procedure may be realized by a resume message. In addition, the configuration message may impose maximum MIMO layer configuration continuity.

FIG. 2 illustrates an example of the Abstract Syntax Notation One (ASN.1) design for the maximum MIMO layer indication configuration in RRC re-establishment procedure in LTE, according to certain embodiments.

Figure 3A:
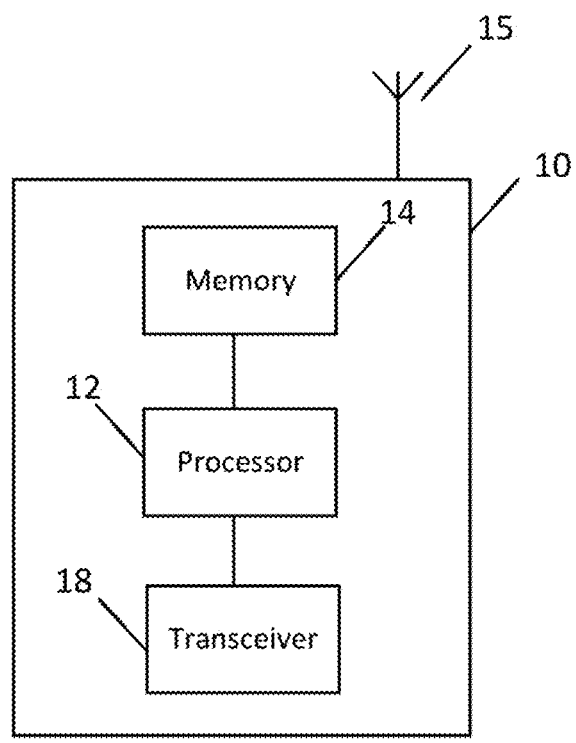
FIG. 3a illustrates an example block diagram of an apparatus, according to one embodiment.

FIG. 3a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be standalone apparatuses communicating with each other via a radio path or via a wired connection, or they may be located in a same entity communicating via a wired connection. It should be noted that one of ordinary skill in the art would understand that apparatus 10 may include components or features not shown in FIG. 3a.

As illustrated in FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, Node B, eNB, 5G or new radio Node B (gNB) or access point, WLAN access point, or the like. According to certain embodiments, apparatus 10 may be controlled by memory 14 and processor 12 to perform the functions associated with any of the embodiments described herein.

In one embodiment, apparatus 10 may be controlled by memory 14 and processor 12 to receive a request for RRC re-establishment or resume from a UE. According to an embodiment, the request for RRC re-establishment or resume may include an indication of the parameter continuity, such as maximum MIMO layers, which was a part of the UE's configuration. For example, in NR deployment, apparatus 10 may be controlled by memory 14 and processor 12 to receive from the UE an indication of the physical layer parameters configuration used by the UE from a group that determines the UE's performance. In an example embodiment, the UE may indicate an estimate of current channel quality to guide apparatus 10 in whether the current configuration is still valid.

Upon receiving the request for RRC re-establishment or resume for which UE context is found (e.g., from stored UE contexts or via context fetch), apparatus 10 may be controlled by memory 14 and processor 12 to determine whether to accept the request including the physical layer parameter continuation/reconfiguration (e.g., the UE indication of channel quality may prompt the NW node to change or retain the configuration). In certain embodiments, apparatus 10 may be controlled by memory 14 and processor 12 to receive from the UE an indication that the UE was subject to maximum MIMO layer configuration (e.g., determined from maxLayersMIMO-r10 configuration parameter availability). In NR, apparatus 10 may be controlled by memory 14 and processor 12 to receive a predefined category of physical layer parameters that need to be maintained during reestablishment or resumption. Alternatively, apparatus 10 may be controlled by memory 14 and processor 12 to receive such UE's context so as to support apparatus 10 to maintain device's configuration continuity.

In certain embodiments, upon receiving RRC connection re-establishment request from the UE, apparatus 10 may be controlled by memory 14 and processor 12 to determine which order of MIMO layer was applicable. According to an embodiment, apparatus 10 may be controlled by memory 14 and processor 12 to utilize UE capabilities or UE context to maintain the maximum MIMO layer configuration continuity.

According to some embodiments, upon deciding for re-establishment/resume, apparatus 10 may be controlled by memory 14 and processor 12 to generate RRC message that facilitates continued configuration of physical layer parameters (e.g. maximum layer MIMO configuration) for the UE. In an embodiment, apparatus 10 may be controlled by memory 14 and processor 12 to signal the consistent configuration to the UE, including appropriate configuration for physical layer parameters according to the UE context/capabilities (e.g., maximum MIMO layers used).

Figure 3B:
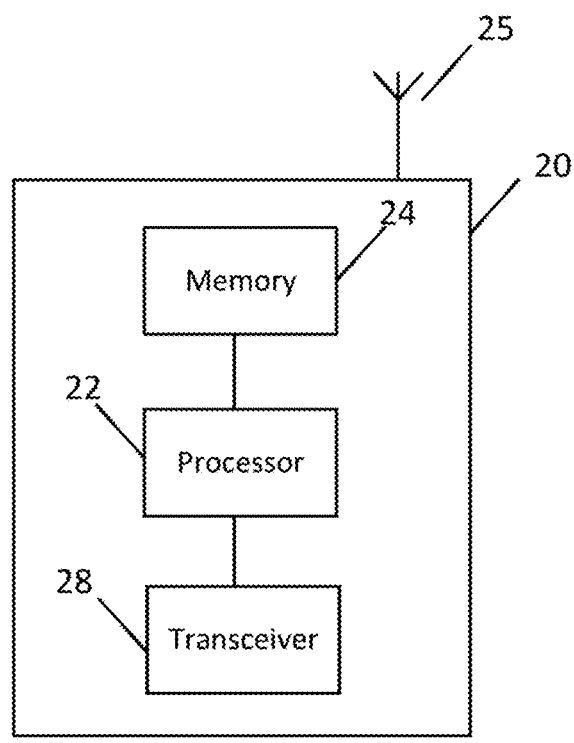
FIG. 3b illustrates an example block diagram of an apparatus, according to another embodiment.

FIG. 3b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and any other radio access technologies. It should be noted that one of ordinary skill in the art would understand that apparatus 20 may include components or features not shown in FIG. 3b.

As illustrated in FIG. 3b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to one embodiment, apparatus 20 may be controlled by memory 24 and processor 22 to transmit a request for RRC re-establishment or resume to a network node (e.g., eNB or gNB). According to an embodiment, the request for RRC re-establishment or resume may include an indication of the parameter continuity, such as maximum MIMO layers, which was a part of the configuration of apparatus 20. For example, in NR deployment, apparatus 20 may be controlled by memory 24 and processor 22 to send, to the network node, an indication of the physical layer parameters configuration used by the apparatus 20 from a group that determines the UE's performance. In an example embodiment, apparatus 20 may be controlled by memory 24 and processor 22 to indicate an estimate of current channel quality to guide network in whether the current configuration is still valid.

In certain embodiments, apparatus 20 may be controlled by memory 24 and processor 22 to send, to the network node, an indication that the apparatus 20 was subject to maximum MIMO layer configuration (e.g., determined from maxLayersMIMO-r10 configuration parameter availability). In NR, apparatus 20 may be controlled by memory 24 and processor 22 to send a predefined category of physical layer parameters that need to be maintained during reestablishment or resumption. Alternatively, apparatus 20 may be controlled by memory 24 and processor 22 to send its context information so as to support the network node to maintain the configuration continuity of apparatus 20.

In certain embodiments, upon the network node deciding for re-establishment/resume, apparatus 20 may be controlled by memory 24 and processor 22 to receive a RRC message that facilitates continued configuration of physical layer parameters (e.g., maximum layer MIMO configuration) for the apparatus 20. In an embodiment, apparatus 20 may be controlled by memory 24 and processor 22 to receive signaling of a consistent configuration, including appropriate configuration for physical layer parameters according to the context/capabilities of apparatus 20 (e.g., maximum MIMO layers used).

Accordingly, in an embodiment, apparatus 20 may be controlled by memory 24 and processor 22 to receive RRC re-establishment or resume message from the network node, and the message may include a configuration that applies continuity of the previously used parameters (e.g., transmission mode and maximum MIMO layer configuration). If the network node indicates the same configuration as before, apparatus 20 may be controlled by memory 24 and processor 22 to maintain the currently used configuration and continue to use it (e.g., maintains the maximum MIMO layer configuration as it had before re-establishment).

Figure 4A:
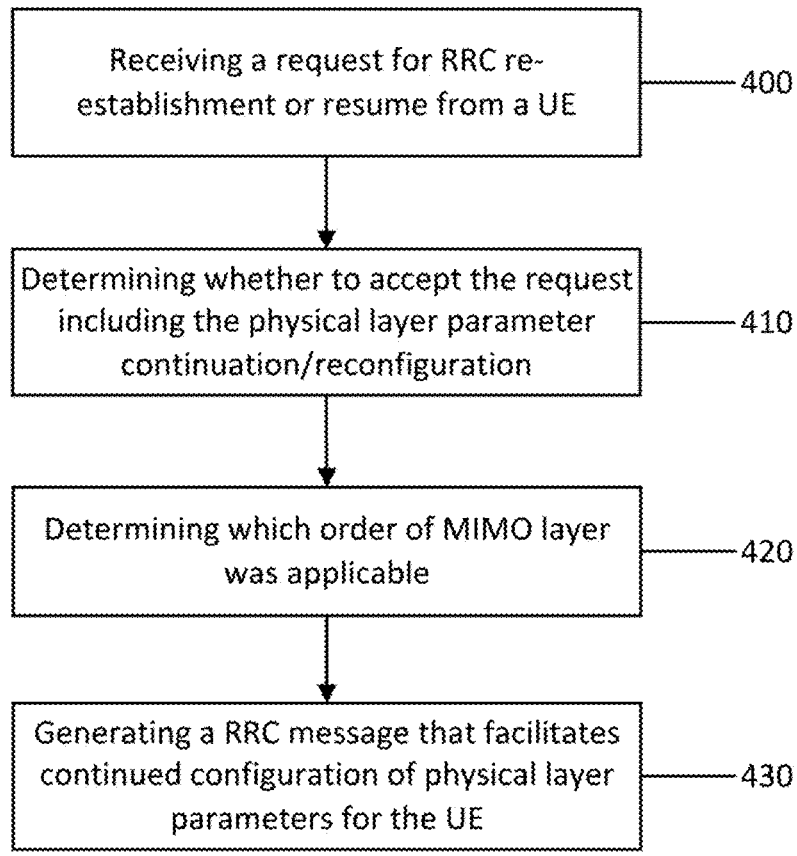
FIG. 4a illustrates an example flow diagram of a method, according to one embodiment.

FIG. 4a illustrates an example flow diagram of a method, according to one embodiment. The method may be performed by a network node, such as a base station, eNB, gNB, or access node, for example. The method of FIG. 4a may include, at 400, receiving a request for RRC re-establishment or resume from a UE. According to an embodiment, the receiving 400 may include receiving the request for RRC re-establishment or resume including an indication of the parameter continuity, such as maximum MIMO layers, which was a part of the UE's configuration. For example, in NR deployment, the receiving 400 may include receiving from the UE an indication of the physical layer parameters configuration used by the UE from a group that determines the UE's performance. In an example embodiment, the indication from the UE may include an estimate of current channel quality to guide the network node in whether the current configuration is still valid.

In certain embodiments, the receiving 400 may include receiving from the UE an indication that the UE was subject to maximum MIMO layer configuration (e.g., determined from maxLayersMIMO-r10 configuration parameter availability). In NR, the receiving 400 may include receiving a predefined category of physical layer parameters that need to be maintained during reestablishment or resumption. Alternatively, the receiving 400 may include receiving the UE's context so as to support the network node to maintain device's configuration continuity. Upon receiving the request for RRC re-establishment or resume for which UE context is found (e.g., from stored UE contexts or via context fetch), the method may include, at 410, determining whether to accept the request including the physical layer parameter continuation/reconfiguration (e.g., the UE indication of channel quality may prompt the NW node to change or retain the configuration).

In certain embodiments, upon receiving RRC connection re-establishment request form the UE, the method may include, at 420, determining which order of MIMO layer was applicable. According to an embodiment, the method may include utilizing UE capabilities or UE context to maintain the maximum MIMO layer configuration continuity.

According to some embodiments, upon determining 410 to accept the request for RRC re-establishment/resume, the method may include, at 430, generating a RRC message that facilitates continued configuration of physical layer parameters (e.g., maximum layer MIMO configuration) for the UE. In an embodiment, the method may include signaling the consistent configuration to the UE, including appropriate configuration for physical layer parameters according to the UE context/capabilities (e.g., maximum MIMO layers used).

Figure 4B:
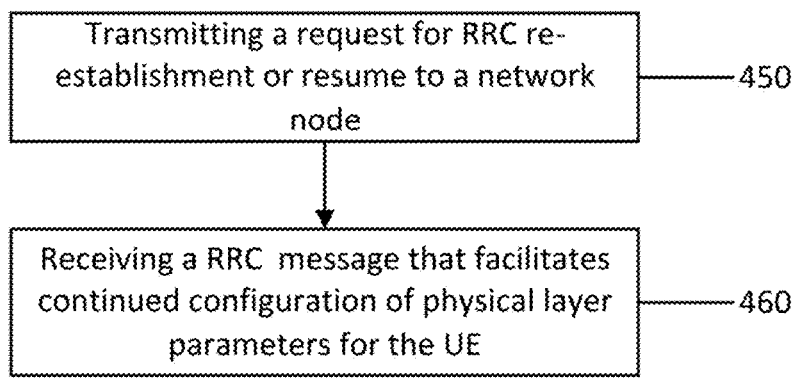
FIG. 4b illustrates an example flow diagram of a method, according to another embodiment.

FIG. 4b illustrates an example flow diagram of a method, according to one embodiment. The method may be performed by a UE or mobile station, for example. In an embodiment, the method may include, at 450, transmitting a request for RRC re-establishment or resume to a network node (e.g., eNB or gNB). According to an embodiment, the transmitting may include transmitting the request for RRC re-establishment or resume including an indication of the parameter continuity, such as maximum MIMO layers, which was a part of the configuration of the UE. For example, in NR deployment, the transmitting 450 may include sending, to the network node, an indication of the physical layer parameters configuration used by the UE from a group that determines the UE's performance. In an example embodiment, the transmitting 450 may include indicating an estimate of current channel quality to guide network in whether the current configuration is still valid.

In certain embodiments, the transmitting 450 may include sending, to the network node, an indication that the UE was subject to maximum MIMO layer configuration (e.g., determined from maxLayersMIMO-r10 configuration parameter availability). In NR, the transmitting 450 may include sending a predefined category of physical layer parameters that need to be maintained during reestablishment or resumption. Alternatively, the transmitting 450 may include the UE sending its context information so as to support the network node to maintain the configuration continuity of the UE.

In certain embodiments, upon the network node deciding for re-establishment/resume, the method may include, at 460, receiving a RRC message that facilitates continued configuration of physical layer parameters (e.g., maximum layer MIMO configuration) for the UE. In an embodiment, the receiving 460 may include signaling of a consistent configuration, including appropriate configuration for physical layer parameters according to the context/capabilities of the UE (e.g., maximum MIMO layers used).

Accordingly, in an embodiment, the receiving 460 may include receiving RRC re-establishment or resume message from the network node, and the message may include a configuration that applies continuity of the previously used parameters (e.g., transmission mode and maximum MIMO layer configuration). If the network node indicates the same configuration as before, the method may include, at 470, maintaining the currently used configuration and continuing to use it (e.g., maintains the maximum MIMO layer configuration as it had before re-establishment).

In view of the above, embodiments of the invention provide several technical effects and/or improvements and/or advantages. For example, certain embodiments ensure RRC layer awareness of key physical layer parameters settings in order to avoid user device performance degradation. As a result, certain embodiments can improve performance and throughput of devices and network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One embodiment is directed to a method that may include receiving, by a network node, a request for RRC re-establishment or resume from a UE. According to an embodiment, the request may include an indication of the parameter continuity that was a part of the UE's configuration. In an embodiment, the indication of the parameter continuity includes an indication of the maximum MIMO layers. In one embodiment, if it is determined to accept the request for RRC re-establishment or resume, the method may include generating a RRC message that facilitates continued configuration of physical layer parameters for the UE.

Another embodiment is directed to an apparatus that may include at least one processor and at least one memory including computer program code. The at least one memory and the computer program code may be configured, with the at least one processor, to cause the apparatus at least to receive a request for RRC re-establishment or resume from a UE. According to an embodiment, the request may include an indication of the parameter continuity that was a part of the UE's configuration. In an embodiment, the indication of the parameter continuity includes an indication of the maximum MIMO layers. In one embodiment, the at least one memory and the computer program code may be configured, with the at least one processor, to cause the apparatus at least to, if it is determined to accept the request for RRC re-establishment or resume, generate a RRC message that facilitates continued configuration of physical layer parameters for the UE.

Another embodiment is directed to a method that may include transmitting, by a UE, a request for RRC re-establishment or resume to a network node. According to an embodiment, the request may include an indication of the parameter continuity that was a part of the UE's configuration. In an embodiment, the indication of the parameter continuity includes an indication of the maximum MIMO layers. In one embodiment, if the network node accepts the request for RRC re-establishment or resume, the method may include receiving a RRC message that facilitates continued configuration of physical layer parameters for the UE.

Another embodiment is directed to an apparatus that may include at least one processor and at least one memory including computer program code. The at least one memory and the computer program code may be configured, with the at least one processor, to cause the apparatus at least to transmit a request for RRC re-establishment or resume to a network node. According to an embodiment, the request may include an indication of the parameter continuity that was a part of the apparatus' configuration. In an embodiment, the indication of the parameter continuity includes an indication of the maximum MIMO layers. In one embodiment, if the network node accepts the request for RRC re-establishment or resume, the at least one memory and the computer program code may be configured, with the at least one processor, to cause the apparatus at least to receive a RRC message that facilitates continued configuration of physical layer parameters for the UE.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of example embodiments, reference should be made to the appended claims.

We claim:

1. A method, comprising:
receiving, by a network node, a request for radio resource control (RRC) re-establishment or resume from a user equipment, wherein the request comprises an indication of parameter continuity that was a part of the user equipment's configuration;
when it is determined to accept the request for radio resource control (RRC) re-establishment or resume, generating a radio resource control (RRC) message for facilitating continued configuration of one or more lower layer parameters for the user equipment.

2. The method according to claim 1, wherein the indication of the parameter continuity comprises an indication of one or more lower layer parameters.

3. The method according to claim 2, wherein the indication of the parameter continuity comprises an indication of one or more physical layer parameters.

4. The method according to claim 1, further comprising receiving an indication, from the user equipment, of an estimate of current channel quality to guide the network node in whether the user equipment's current configuration is still valid.

5. The method according to claim 1, further comprising receiving a predefined category of one or more lower layer parameters that need to be maintained during radio resource control (RRC) re-establishment or resume.

6. The method according to claim 3, wherein the indication of the parameter continuity comprises an indication of one or more parameters configuring maximum multiple-input multiple-output (MIMO) layers.

7. The method according to claim 6, wherein, upon receiving radio resource control (RRC) connection re-establishment request from the user equipment, determining which order of multiple-input multiple-output (MIMO) layer was applicable.

8. The method according to claim 2, further comprising utilizing capabilities or context of the user equipment to maintain the maximum multiple-input multiple-output (MIMO) layer configuration continuity.

9. The method according to claim 1, further comprising signaling the continued configuration to the user equipment, wherein the continued configuration comprises appropriate configuration for one or more physical layer parameters according to capabilities or context of the user equipment.

10. An apparatus, comprising:
at least one processor; and
at least one memory comprising computer program code,
the at least one memory and computer program code configured, with the at least one processor, to cause the apparatus at least to
receive a request for radio resource control (RRC) re-establishment or resume from a user equipment, wherein the request comprises an indication of parameter continuity that was a part of the user equipment's configuration;
when it is determined to accept the request for radio resource control (RRC) re-establishment or resume, generate a radio resource control (RRC) message for facilitating continued configuration of one or more lower layer parameters for the user equipment.

11. The apparatus according to claim 10, wherein the indication of the parameter continuity comprises an indication of one or more physical layer parameters.

12. The apparatus according to claim 11, wherein the indication of the parameter continuity comprises an indication of one or more parameters configuring maximum multiple-input multiple-output (MIMO) layers.

13. The apparatus according to claim 10, wherein the at least one memory and computer program code are further configured, with the at least one processor, to cause the apparatus at least to receive an indication, from the user equipment, of an estimate of current channel quality to guide the apparatus in whether the user equipment's current configuration is still valid.

14. The apparatus according to claim 10, wherein the at least one memory and computer program code are further configured, with the at least one processor, to cause the apparatus at least to receive a predefined category of physical layer parameters that need to be maintained during radio resource control (RRC) re-establishment or resume.

15. The apparatus according to claim 10, wherein, upon receiving radio resource control (RRC) connection re-establishment request from the user equipment, the at least one memory and computer program code are further configured, with the at least one processor, to cause the apparatus at least to determine which order of multiple-input multiple-output (MIMO) layer was applicable.

16. The apparatus according to claim 11, wherein the at least one memory and computer program code are further configured, with the at least one processor, to cause the apparatus at least to utilize capabilities or context of the user equipment to maintain the maximum multiple-input multiple-output (MIMO) layer configuration continuity.

17. The apparatus according to claim 10, wherein the at least one memory and computer program code are further configured, with the at least one processor, to cause the apparatus at least to signal the continued configuration to the user equipment, wherein the continued configuration comprises appropriate configuration for physical layer parameters according to capabilities or context of the user equipment.

18. A method, comprising:
    transmitting, by a user equipment, a request for radio resource control (RRC) re-establishment or resume to a network node, wherein the request comprises an indication of parameter continuity that was a part of the user equipment's configuration;
    when the network node accepts the request for radio resource control (RRC) re-establishment or resume, receiving a radio resource control (RRC) message that facilitates continued configuration of one or more physical layer parameters for the user equipment.

19. The method according to claim 18, wherein the indication of the parameter continuity comprises an indication of one or more parameters configuring maximum multiple-input multiple-output (MIMO) layers.

20. A non-transitory computer readable medium comprising program instructions stored thereon for performing the method according to claim 1.

21. A non-transitory computer readable medium comprising program instructions stored thereon for performing the method according to claim 18.

* * * * *